(12) United States Patent
Banzhaf et al.

(10) Patent No.: US 11,003,187 B2
(45) Date of Patent: May 11, 2021

(54) GENERATING PARKING SPACE FOR VEHICLES

(71) Applicant: Robert Bosch GmbH, Stuttgart (DE)

(72) Inventors: Holger Andreas Banzhaf, Laichingen (DE); Joerg Klingler, Gerlingen (DE); Franz Fehrenbach, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 385 days.

(21) Appl. No.: 15/908,064

(22) Filed: Feb. 28, 2018

(65) Prior Publication Data

US 2018/0253101 A1    Sep. 6, 2018

(30) Foreign Application Priority Data

Mar. 2, 2017    (DE) .......................... 102017203408.4

(51) Int. Cl.
*G05D 1/02* (2020.01)
*G08G 1/14* (2006.01)
*G08G 1/04* (2006.01)
*G08G 1/095* (2006.01)

(52) U.S. Cl.
CPC ............. *G05D 1/0212* (2013.01); *G08G 1/04* (2013.01); *G08G 1/095* (2013.01); *G08G 1/142* (2013.01); *G08G 1/143* (2013.01); *G08G 1/147* (2013.01)

(58) Field of Classification Search
CPC .... B62D 15/0285; G05D 1/0212; G08G 1/04; G08G 1/095; G08G 1/142; G08G 1/143; G08G 1/147
See application file for complete search history.

(56) References Cited

U.S. PATENT DOCUMENTS

| | | | |
|---|---|---|---|
| 6,577,946 B2* | 6/2003 | Myr | G08G 1/0104 455/456.5 |
| 9,857,796 B2* | 1/2018 | Rakshit | G08G 1/056 |
| 10,241,519 B2* | 3/2019 | Nagai | G05D 1/0274 |
| 2007/0088490 A1* | 4/2007 | Sutardja | G08G 1/127 701/117 |
| 2014/0085109 A1 | 3/2014 | Stefik et al. | |
| 2014/0249742 A1* | 9/2014 | Krivacic | G06Q 10/02 701/400 |
| 2014/0335897 A1 | 11/2014 | Clem et al. | |

(Continued)

FOREIGN PATENT DOCUMENTS

| | | |
|---|---|---|
| DE | 102009028024 A1 | 2/2011 |
| DE | 102012009813 A1 | 11/2013 |

(Continued)

*Primary Examiner* — Jeff A Burke
*Assistant Examiner* — Jamal A Shah
(74) *Attorney, Agent, or Firm* — Norton Rose Fulbright US LLP; Gerard Messina

(57) ABSTRACT

A system includes a processor that, for example, by executing a computer program, performs a method for generating parking space for vehicles, the method including ascertaining whether a need exists for parking space for vehicles within a geographical area that includes a roadway, if the need is determined to exist, ascertaining whether a side area of the roadway is usable as parking space, and, responsive to a positive result of the determination, designate the side area as the parking space, and control a signaling device to signal the availability of the side area for vehicle parking.

11 Claims, 2 Drawing Sheets

(56) References Cited

U.S. PATENT DOCUMENTS

2015/0294286 A1* 10/2015 Grote .................. G06Q 20/145
                                                      705/13
2016/0180261 A1    6/2016 Rosen et al.
2016/0371607 A1   12/2016 Rosen et al.

FOREIGN PATENT DOCUMENTS

| DE | 102014212843 A1 | 1/2016 |
| DE | 102015201205 A1 | 7/2016 |
| JP | 2016065498 A * | 4/2016 |

* cited by examiner

GENERATING PARKING SPACE FOR VEHICLES

CROSS-REFERENCE TO RELATED APPLICATIONS

The present application claims priority under 35 U.S.C. § 119 to DE 10 2017 203 408.4, filed in the Federal Republic of Germany on Mar. 2, 2017, the content of each of which is hereby incorporated by reference herein in its entirety.

FIELD OF THE INVENTION

The present invention relates to a method, system, and computer program for generating parking space for vehicles.

BACKGROUND

The unexamined patent application DE 10 2009 028 024 A1 shows a parking guiding system for the navigation of a vehicle searching for a parking place to an available parking place.

The unexamined patent application DE 10 2015 201 205 A1 shows a valet parking method.

One of the significant challenges of modern towns or large cities is a provision of sufficient parking space. Added to this is a continuing trend of more and more people moving into metropolitan areas, often with their own motor vehicles.

This can bring about a disproportionately long search for an available parking place for a motor vehicle. In general, motor vehicle traffic searching for a parking place produces a significant share of total city traffic.

SUMMARY

An object underlying the present invention is to be seen as the providing of an efficient concept for efficiently generating parking space for vehicles.

According to one aspect, a method for generating parking space for vehicles includes ascertaining whether a need exists for parking space for vehicles within a geographical area that includes a roadway, if a need for a parking space exists, ascertaining whether a side area of the roadway can be designated for use as parking space, and, if so, designating the side area of the roadway for use as parking space and signaling that the designated side area is made available for vehicles to park.

According to another aspect, a system for generating parking space for vehicles includes a processor configured to ascertain whether a need exists for a parking space for vehicles within a geographical area that includes a roadway; if the need exists for a parking space, ascertain whether a side area of the roadway can be designated for use as parking space; and if so, designate the side area of the roadway for use as parking space and control a signaling device for signaling that the designated side area is made available for vehicles to park.

According to another aspect, a computer program is provided, which includes program code for carrying out the method for generating parking space for vehicles, when the computer program is executed on a computer, in particular on the processor of the system.

The present invention is based on the finding that the aforementioned object can be achieved by making available a side area of a roadway for vehicles to park based on certain, e.g., two or three (see also the embodiments described below), conditions.

According to an example embodiment, the designation is responsive to satisfaction of two conditions including that a need for a parking space for vehicles within the geographical area is determined to exist and that an instantaneous traffic situation allows for a side area of the roadway to be used for parking instead of for travel.

Thus, as long as these two prerequisites or conditions are met, the side area is designated for use as parking space, this being signaled accordingly to the traffic.

This yields, in particular, a technical advantage that additional parking space for vehicles, the designated side area, can be generated.

Thus, this yields a technical advantage, therefore, that an efficient concept for the efficient generation of parking space for vehicles can be provided.

The side area made available as parking space may also be referred to as a generated parking space.

Vehicles within the context of the description are, for example, motor vehicles, motorcycles, bicycles, so-called pods, i.e., automated shuttles, vans, shared mobility devices, passenger cars, trucks. When the term "motor vehicle" is used, it is intended to always include the more general term "vehicle."

A side area within the context of the description is bounded on a longitudinal side by a margin of the roadway.

A width of the side area according to an example embodiment is at least 2.5 m, in particular, at least 2.75 m.

A width of the side area according to an example embodiment is a maximum of 3.75 m.

A width of the side area according to an example embodiment is between 2.75 m and 3.75 m.

A parking space within the context of the description refers, for example, to a surface on which vehicles may park or may be stored.

If a parking space is already available within the geographical area, in particular, alongside the roadway, additional parking space is therefore generated by designating the side area as parking space, i.e., in addition to the already available parking space.

Thus, if a parking space already exists within the geographical area, in particular, alongside the roadway, the wording "parking space" may be replaced by "additional parking space."

A particular advantage of the present invention is that automated vehicles may park on the roadside in front of vehicles already parked within the already existing parking space. As a result of automation, it is possible to implement re-parking processes which, for example, are further elucidated by way of example in conjunction with FIG. 3 below.

If automated vehicles are parked alongside the roadway in front of cars already parked within the already existing parking space, it is provided according to an example embodiment to coordinate or to control necessary re-parking processes. Such re-parking processes are also provided, for example, if automated vehicles, which park within the additional parking space, block already existing parking places for parking, in particular, existing available parking places, of the already existing parking space.

In the event additional parking space is generated in front of an already existing parking space, it is provided according to an example embodiment a third condition (see explanations above) is that the additional parking spaces in the side area of the roadway are made available for parking of only automated vehicles, which can be remotely controlled or which are able to drive autonomously. This example embodiment is explained in greater detail below.

According to an example embodiment, the signaling includes a transmitting of a message to a network address via a communication network. A communication network includes, for example, a mobile communication network and/or a WLAN network. Thus, users of the communication network can be efficiently informed in an advantageous manner that a side area of the roadway is made available for vehicles to park.

The network address is assigned, for example, to a terminal, in particular, to a mobile terminal, for example, a mobile telephone. The terminal is included, for example, in a motor vehicle, in particular, in an automated motor vehicle.

The signaling according to an example embodiment is carried out with the aid of an activated display and/or of an activated sign and/or of an activated light, which is further explained below.

According to an example embodiment, it is provided that it is signaled that exclusively automated vehicles are allowed to park within the designated side area.

This yields a technical advantage, for example, that the designated side area can be efficiently utilized because automated vehicles can park without a driver, as a result of which such vehicles can be parked so close to each other that there is no longer any space for getting in or getting out and or loading or unloading. This is because such space is no longer needed if there is no driver situated within the motor vehicle, who must get out of the vehicle after parking.

Furthermore, re-parking processes can be efficiently implemented in the case of automated vehicles, so that, for example, the automated vehicles can be re-parked at any time in such a way that after the re-parking a particularly efficient and optimal utilization of the parking space, i.e., the designated side area, is effectuated.

An automated motor vehicle within the context of the description refers, in particular, to a motor vehicle, which can be driverlessly driven, i.e., without a human driver. An automated motor vehicle can be remotely controlled, for example. An automated motor vehicle can be driven autonomously, for example.

According to an example embodiment, it is provided that if the designated side area is located adjacent to an additional parking space next to the roadway, and an automated motor vehicle parked within the designated side area, which is blocking an unparking of an additional motor vehicle parked within the additional parking space, the automated motor vehicle, upon detection of an unparking input for the additional motor vehicle, is automatically controlled in such a way as to be guided driverlessly from its instantaneous position into a target position, in which the automated motor vehicle no longer blocks the unparking of the additional motor vehicle.

This yields a technical advantage, for example, that the side area can also be located in front of the additional parking space. The automated vehicles can, if needed, be driven to the side at any time, in order to allow the unparking motor vehicle to unpark.

According to another example embodiment, a number of available parking places in the geographical area and a number of vehicles searching for parking places in the geographical area are ascertained, the ascertainment of whether a need exists being carried out based on the number of available parking places in the geographical area and on the number of vehicles searching for parking places in the geographical area.

This yields, in particular, a technical advantage that it can be efficiently ascertained whether a need for a parking space for vehicles exists.

Thus, according to this example embodiment, it is provided that a demand for and a supply of available parking places is ascertained.

A number of available parking places in the geographical area can be ascertained, for example, using parking place occupancy sensors, which are assigned to the parking places in the geographical area, i.e., which monitor these parking places. These parking place occupancy sensors, therefore, detect an instantaneous occupancy state of the parking place and, for example, convey this detected occupancy state to the system, which is then able to ascertain the number of available parking places in the geographical area.

A number of vehicles searching for parking places can be ascertained, for example, by vehicles searching for parking places communicating via a communication network that they are searching for an available parking place. Thus, the vehicles searching for parking places transmit, in particular, a request to the system that they are searching for a parking place. The system, as a user of such a communication network, can therefore efficiently ascertain a number of vehicles searching for parking places based on the corresponding requests of the vehicles searching for parking places.

According to an example embodiment, traffic data indicating a traffic flow within the geographical area are ascertained, the ascertainment of whether a side area of the roadway can be designated for use as parking space being carried out based on the traffic data. The traffic flow includes, for example in particular, a traffic flow on the roadway. This yields, for example, a technical advantage that it can be efficiently ascertained whether a side area of the roadway can be designated for use as parking space. Thus, according to this example embodiment, it is provided that it is checked whether an instantaneous traffic situation allows a side area of the roadway to be made available for use as parking space.

A designation of the side area of the roadway for use as parking space means that the roadway will narrow, which can negatively impact a traffic flow. It can, for example, result in congested traffic or even in a traffic jam.

Taking the traffic flow into consideration yields, in particular, a technical advantage that traffic jams or congested traffic can be efficiently avoided due to the designation of the side area for use as parking space.

According to an example embodiment, it is provided that the signaling includes an illumination of the designated area. This yields, for example, a technical advantage that it can be efficiently visually signaled to the traffic where the designated area is located.

One or multiple lights, which are located, for example, on the margin of the roadway, are provided for illuminating the designated area.

According to yet another example embodiment, the signaling includes an activation of a visual signal transmitter, in particular, of an electronic sign. This yields, for example, a technical advantage that the area made available can be efficiently visually signaled to traffic.

The optical signal transmitter is an electronic sign, for example. Thus, an electronic sign can efficiently signal to traffic, for example, with the aid of one or of multiple pictograms or text, that the designated area is made available for parking.

It is provided, for example, that the signal transmitter, in particular, the electronic sign, is provided in front of the designated area relative to a driving direction or is situated alongside the roadway.

According to an example embodiment, the signaling includes a raising of a boundary element, in particular, a sign, a guard rail or bollard, from the roadway. This yields, for example, a technical advantage that the signaling can be efficiently carried out. This effectuates, in particular, an efficient concrete or physical boundary or demarcation between the designated area and the rest of the roadway. Therefore, this means, in particular, that if the side area is not made available for use as parking space, the boundary element is lowered into the roadway. The boundary element is raised from the roadway only if the side area is made available as parking space.

According to an example embodiment, it is provided that the system for generating parking space for vehicles is designed or configured to execute or carry out the method for generating parking space for vehicles.

According to an example embodiment, the method for generating parking space for vehicles is executed or carried out with the aid of the system for generating parking space for vehicles. System features result, in particular, analogously from corresponding method features and vice versa. Therefore, this means, in particular, that technical functionalities of the system result analogously from corresponding functionalities of the method and vice versa.

According to an example embodiment, the signaling device is designed to signal that exclusively automated vehicles are allowed to park within the designated side area.

According to an example embodiment, the processor is designed to driverlessly guide an automated motor vehicle parking within the side area from its instantaneous position into a target position, in which the automated motor vehicle no longer blocks the unparking of the additional vehicle, which is parked within the additional parking space.

According to an example embodiment, the processor is designed to ascertain a number of available parking places in the geographical area and a number of vehicles searching for parking places in the geographical area, the processor further being designed to carry out the ascertainment of whether a need exists based on the number of available parking places in the geographical area and based on the number of vehicles searching for parking places in the geographical area.

According to an example embodiment, the processor is designed to ascertain traffic data, which indicate a traffic flow within the geographical area, the processor further being designed to carry out the ascertainment of whether, based on the traffic data, a side area of the roadway can be designated for use as parking space.

According to an example embodiment, the signaling device includes one or multiple lights or one or multiple illuminants, for example, light-emitting diodes.

In an example embodiment, it is provided that a graphic element, for example, a pictogram or an arrow is projected onto the roadway, which indicates the designated area. A projector, for example, is provided on the roadway margin for such a projection. Such a projector is mounted, for example, on a lamppost of a lamp, which is situated on the roadway margin.

According to an example embodiment, the signaling device includes a visual signal transmitter, for example, an electronic sign.

According to an example embodiment, the signaling device includes a boundary element, which can be raised from the roadway and/or retracted into the roadway. The boundary element is, for example, a sign, for example, an electronic sign, a guardrail, or a bollard.

The signaling device includes, for example, multiple of such boundary elements.

The wording "respectively" includes, in particular, the wording "and/or."

The present invention is explained in greater detail below with reference to preferred exemplary embodiments.

DETAILED DESCRIPTION

Figure 1:
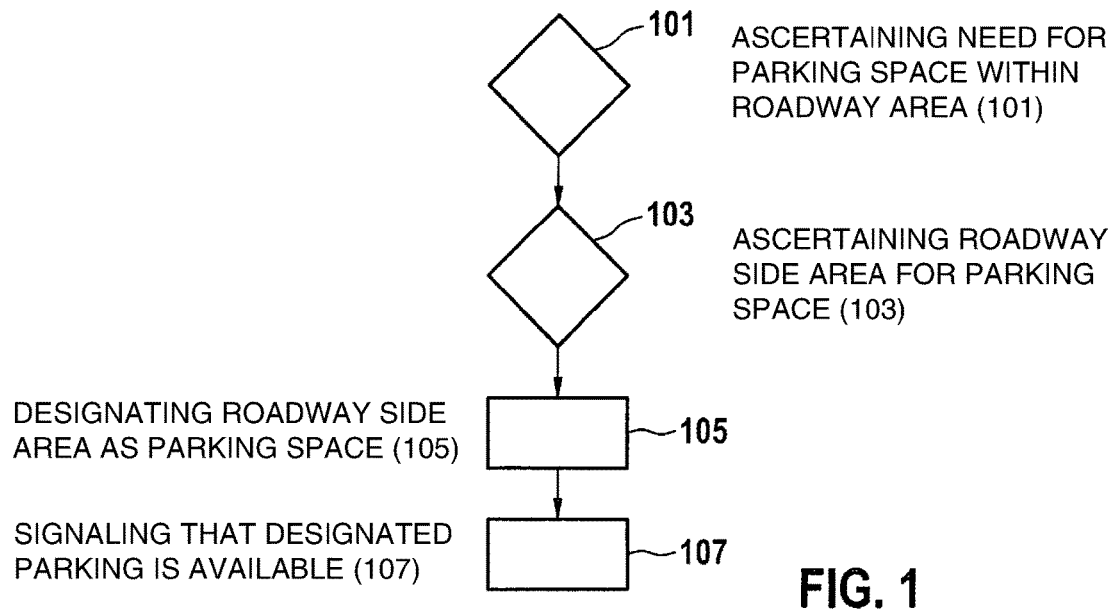
FIG. 1 is a flowchart of a method for generating parking space for vehicles, according to an example embodiment of the present invention.

FIG. 1 is a flowchart of a method for generating parking space for vehicles. The method includes: ascertaining 101 whether an (additional) need exists for a parking space for vehicles within a geographical area that includes a roadway; if a need for a parking space exists, ascertaining 103 whether a side area of the roadway may be designated for use as parking space; if so, designating 105 the side area of the roadway for use as parking space; and signaling 107 that the designated side area is made available for vehicles to park.

Step 101 includes, for example, an ascertainment of a number of available parking places in the geographical area and a number of vehicles searching for parking places in the geographical area. Thus, this means, for example, that a supply of and demand for parking places in the geographical area is ascertained.

Alternatively or in addition, this can take place based on historic data, i.e., for example, that on Mondays (i.e., in general on a particular day of the week) at 9:00 AM (in general at a particular time of day), there is little prevailing traffic on the roadway (traffic flow less or less than-equal to a predefined traffic flow threshold value), but there is always a very high demand for parking space (demand greater or greater than-equal to a predefined need threshold value). As a result, it is then provided, for example, that on Mondays at 9:00 AM the side area is always made available for parking.

If, for example, the supply exceeds the demand, it is determined that there is no need for parking space. If it is ascertained that the demand exceeds the supply, it is determined that a need for parking space exists.

Step 103 includes, for example, that traffic data are ascertained, which indicate a traffic flow within the geographic area, in particular, on the roadway. The ascertainment of whether a side area of the roadway can be designated for use as parking space is carried out, in particular, based on the traffic data.

Therefore, this means, in particular, that according to this example embodiment, it is checked whether it is even possible, based on the instantaneous traffic situation, to designate or make available a side area of the roadway for use as parking space.

If, for example, the traffic flow is less or less than-equal to a predefined traffic flow threshold value, it is determined that a side area of the roadway can be designated for use as parking space.

If, for example, the traffic flow is greater or greater than-equal to the predefined traffic flow threshold value, it is determined that no side area of the roadway can be designated for use as parking space.

Step 107 includes, for example, an activation of an electronic sign, which indicates that the designated area is made available for vehicles to park.

It is provided, for example, that the electronic sign is situated in front of the designated area in relation to a driving direction.

Step 107 includes, for example, a raising of a boundary element, for example, a bollard or a guardrail from the roadway. The boundary element is situated, for example, in front of the designated area in relation to a driving direction.

According to an example embodiment, step 107 includes the transmitting of a corresponding message, i.e., the transmitting of a wireless signal (with the aid of WLAN and/or with the aid of mobile communication), that here (additional) parking space is now being or has been generated.

Figure 2:
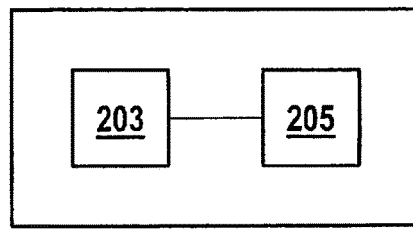
FIG. 2 shows a system for generating parking space for vehicles, according to an example embodiment of the present invention.

FIG. 2 shows a system 201 for generating parking space for vehicles.

System 201 includes: a processor 203 for ascertaining whether a need exists for a parking space for vehicles within a geographical area that includes a roadway, processor 203 being designed, if a need for a parking space exists, to ascertain whether a side area of the roadway can be designated for use as parking space and, if so, to designate the side area of the roadway for use as parking space; and a signaling device 205 for signaling that the designated side area is made available for vehicles to park.

According to an example embodiment, system 201 includes one or multiple video cameras spatially distributed within the geographical areas, in particular, spatially distributed alongside the roadway. The video cameras monitor, for example, traffic within the geographical area, in particular, traffic on the roadway.

Processor 205 is designed, for example, to ascertain a traffic flow based on the video images of the video cameras.

System 201 includes, for example, a communication interface, respectively a communication module, which communication interface, respectively, which communication module, is designed for the purpose of signaling to transmit a message to a network address via a communication network. The communication interface, respectively, the communication module, is included, for example, in signaling device 205.

Figure 3:
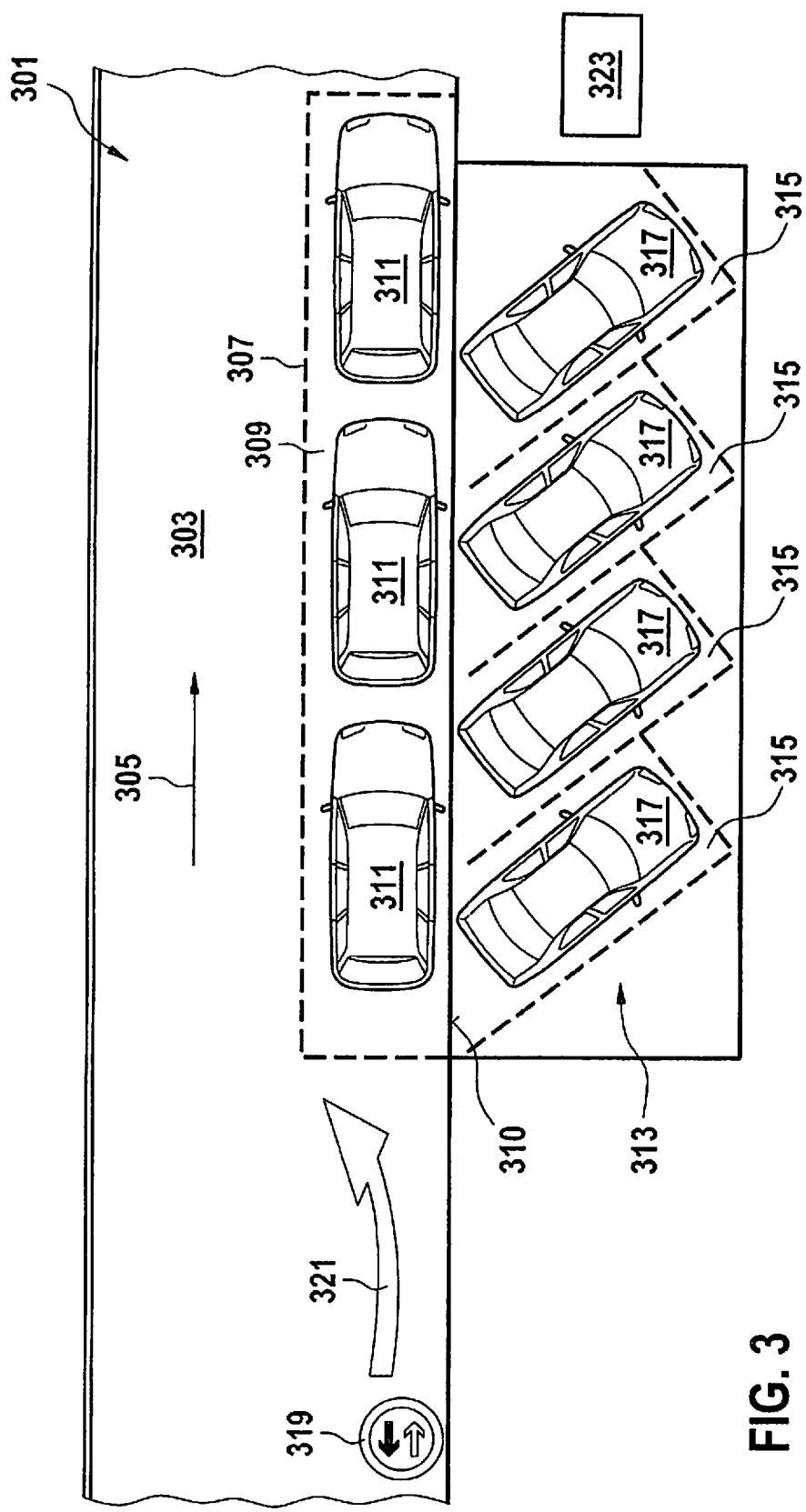
FIG. 3 shows an exemplary use scenario of the concept according to an example embodiment of the present invention.

FIG. 3 shows an exemplary use scenario 301 of the concept according to the present invention. It is a system according to an example embodiment, which is not shown for the sake of clarity.

Accordingly, a roadway 303 is shown, which is situated within a geographical area (not further shown).

An arrow having the reference numeral 305 symbolically represents a driving direction on roadway 303.

A dashed line 307 symbolically delimits a side area 309 of roadway 303. Three automated motor vehicles 311 are parked within side area 309, which is bounded on a longitudinal side by a roadway 301.

Located to the right, adjacent to side area 309 in relation to driving direction 305, is an additional parking space 313. Additional parking space 313 includes four parking places 315, in which one additional motor vehicle 317 each is parked.

Additional motor vehicles 317 are, for example, also automated motor vehicles. However, an additional motor vehicle 317 can, for example, also be a conventional motor vehicle. A conventional motor vehicle refers in particular to a motor vehicle which cannot be driven driverlessly.

In order to signal traffic on roadway 303 that side area 309 is made available for parking, a sign 319, for example, is provided, which points to this narrow section. Sign 319 is raised, for example, from roadway 303. Sign 319 is an electronic sign, for example, which is activated after side area 309 is designated for use as parking space and which indicates or signals to the traffic the narrow section.

It is further provided, for example, that an arrow 321 is projected onto roadway 303, which indicates to the traffic that it must yield to the left in relation to driving direction 305. To project arrow 321, it is provided, for example, that a projector is provided alongside roadway margin 310. Thus, this means, for example, that a projector is activated, which projects arrow 321 onto roadway 303.

If, for example, an unparking input for one of motor vehicles 317 is detected, then, for example, automated motor vehicle 311, which blocks motor vehicle 317 intending to unpark, is driverlessly guided from its instantaneous position into a target position in such a way that in this target position it no longer blocks motor vehicle 317 to be unparked.

A user of a conventional motor vehicle 317 that intends to unpark, can, for example, transmit a corresponding request, respectively, an unparking input, via a communication network to the system.

FIG. 3 shows a communication module 323 which, for example, is part of a system according to the present invention not further depicted here. Communication module 323 communicates with vehicles, for example, in order to signal these vehicles that additional parking space has been created here. Such vehicles are vehicles, for example, which drive past the additional parking space.

In summary, according to example embodiments of the present invention, additional, highly dense parking space is generated on the side of the roadway depending on the demand for parking space and on an instantaneous traffic flow on the roadway, respectively, within the geographical area.

Significant advantages of the present invention are to be seen, in particular, in a gain in parking places in inner cities, which advantageously shortens a parking place search. In this way, traffic searching for parking places can, in particular, be reduced.

A dynamically adaptable division of traffic flow and parking space is advantageously enabled, depending on the demand. In a residential neighborhood, for example, a traffic flow late in the evening is expected to be less than during the day. In general, however, there is a great need for parking space late in the evening within a residential neighborhood.

Furthermore, systems of the present invention advantageously incentivize owning an automated motor vehicle. This is because according to an example embodiment, it can be provided that the designated side area is made available exclusively to automated motor vehicles for parking.

What is claimed is:

1. A method, using a processor, for generating a parking space for a vehicle, the method comprising:
   determining, by the processor, that there is a need for the parking space for the vehicle within a geographical area that includes a roadway;
   determining, responsive to the determination of the parking space need, by the processor, whether a side area of the roadway can be designated for use as the parking space;

responsive to a positive result of the determination by the processor regarding the side area:
    designating, by the processor, the side area of the roadway for use as the parking space; and
    controlling, by the processor, a device to output a signal indicating that the side area is available as the parking space; and
ascertaining, by the processor, a traffic flow within the geographical area, wherein the determination of whether the side area of the roadway can be designated for use as the parking space is based on the ascertained traffic flow,
wherein the signaling includes transmitting a message to a network address via a communication network, and wherein the communication network includes a mobile communication network and/or a WLAN network, to inform a user of the communication network that the side area of the roadway is available for parking a vehicle,
wherein the network address is assigned to a terminal, and/or a mobile terminal, and/or a mobile telephone, and wherein the terminal, and/or a mobile terminal, and/or a mobile telephone is associated with an automated motor vehicle,
wherein the parking space does not have a parking meter,
wherein it is checked, based on the instantaneous traffic situation, whether to designate or make available the side area of the roadway for use as the parking space, and wherein if the traffic flow is less than or equal to a predefined traffic flow threshold value, it is determined to designate or make available the side area of the roadway for use as the parking space, and
wherein the signaling includes an illumination or identification of the designated area, so that it can be visually signaled to the traffic where the designated parking space is located, and wherein at least one light is located on a margin of the roadway for illuminating the designated parking space.

2. The method of claim 1, wherein the signal by the processor includes a signaling that the designated side area is designated for parking therein of only automated vehicles.

3. The method of claim 2, wherein the designated side area is located adjacent to an additional parking space, wherein an automated motor vehicle, which is parked within the designated side area and which blocks an additional motor vehicle from exiting from the additional parking space, and wherein upon detection by the processor of an unparking input for the additional vehicle, the automated motor vehicle is automatically controlled by the processor to driverlessly move into a target position in which the automated motor vehicle no longer blocks the additional vehicle from exiting from the additional parking space.

4. The method of claim 1, further comprising:
    identifying, by the processor, a number of parking places available in the geographical area and a number of vehicles searching for parking places in the geographical area, wherein the determining by the processor that there is a need for a parking space is based on the identified number of parking spaces that are available and the identified number of vehicles searching.

5. The method of claim 1, wherein the output of the signal by the processor includes the illuminating of the side area.

6. The method of claim 1, wherein the device includes a visual signal transmitter, and the controlling includes activating, by the processor, the visual signal transmitter.

7. The method of claim 1, wherein the device includes an electronic sign, and the controlling by the processor includes activating the electronic sign.

8. The method of claim 1, wherein the device includes a boundary element, and the output of the signal includes raising the boundary element from the roadway.

9. The method of claim 8, wherein the boundary element includes at least one of a sign, a guardrail, and/or a bollard.

10. A system for generating a parking space for a vehicle, comprising:
    a signaling device; and
    a processor communicatively coupled to the signaling device, wherein the processor is configured to perform the following:
        determining, by the processor, that there is a need for the parking space for the vehicle within a geographical area that includes a roadway;
        determining, by the processor, responsive to the determination of the parking space need, whether a side area of the roadway can be designated for use as the parking space; and
        responsive to a positive result of the determination by the processor regarding the side area:
            designating, by the processor, the side area of the roadway for use as the parking space; and
            controlling, by the processor, the signaling device to output a signal indicating that the side area is available as the parking space; and
        ascertaining, by the processor, a traffic flow within the geographical area, wherein the determination of whether the side area of the roadway can be designated for use as the parking space is based on the traffic flow as ascertained by the processor,
        wherein the signaling includes transmitting a message to a network address via a communication network, and wherein the communication network includes a mobile communication network and/or a WLAN network, to inform a user of the communication network that the side area of the roadway is available for parking a vehicle,
        wherein the network address is assigned to a terminal, and/or a mobile terminal, and/or a mobile telephone, and wherein the terminal, and/or a mobile terminal, and/or a mobile telephone is associated with an automated motor vehicle,
        wherein the parking space does not have a parking meter,
        wherein it is checked, based on the instantaneous traffic situation, whether to designate or make available the side area of the roadway for use as the parking space, and wherein if the traffic flow is less than or equal to a predefined traffic flow threshold value, it is determined to designate or make available the side area of the roadway for use as the parking space, and
        wherein the signaling includes an illumination or identification of the designated area, so that it can be visually signaled to the traffic where the designated parking space is located, and wherein at least one light is located on a margin of the roadway for illuminating the designated parking space.

11. A non-transitory computer-readable medium having a computer program, which is executable by a processor, comprising:
    a program code arrangement having program code for generating a parking space for a vehicle, by performing the following:

determining, by the processor, that there is a need for the parking space for the vehicle within a geographical area that includes a roadway;

determining, by the processor, responsive to the determination of the parking space need, whether a side area of the roadway can be designated for use as the parking space; and responsive to a positive result of the determination by the processor regarding the side area:
- designating, by the processor, the side area of the roadway for use as the parking space; and
- controlling, by the processor, a device to output a signal indicating that the side area is available as the parking space; and ascertaining, by the processor, a traffic flow within the geographical area, wherein the determination of whether the side area of the roadway can be designated for use as the parking space is based on the traffic flow as ascertained by the processor, wherein the signaling includes transmitting a message to a network address via a communication network, and wherein the communication network includes a mobile communication network and/or a WLAN network, to inform a user of the communication network that the side area of the roadway is available for parking a vehicle, wherein the network address is assigned to a terminal, and/or a mobile terminal, and/or a mobile telephone, and wherein the terminal, and/or a mobile terminal, and/or a mobile telephone is associated with an automated motor vehicle, wherein the parking space does not have a parking meter, wherein it is checked, based on the instantaneous traffic situation, whether to designate or make available the side area of the roadway for use as the parking space, and wherein if the traffic flow is less than or equal to a predefined traffic flow threshold value, it is determined to designate or make available the side area of the roadway for use as the parking space, and wherein the signaling includes an illumination or identification of the designated area, so that it can be visually signaled to the traffic where the designated parking space is located, and wherein at least one light is located on a margin of the roadway for illuminating the designated parking space.

* * * * *